US010334289B2

United States Patent
Yang et al.

(10) Patent No.: US 10,334,289 B2
(45) Date of Patent: *Jun. 25, 2019

(54) EFFICIENT APPROACH TO DYNAMIC FRAME SIZE AND FRAME RATE ADAPTATION

(71) Applicant: Dialogic Corporation, Montreal (CA)

(72) Inventors: Kyeong Ho Yang, Freehold, NJ (US); Beril Erkin, Summit, NJ (US); Antony R. Martin, Westfield, NJ (US)

(73) Assignee: Dialogic Corporation, Montreal, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,138

(22) Filed: Dec. 18, 2017

(65) Prior Publication Data

US 2018/0109823 A1    Apr. 19, 2018

Related U.S. Application Data

(63) Continuation of application No. 14/674,348, filed on Mar. 31, 2015, now Pat. No. 9,883,214.

(51) Int. Cl.
  *H04N 7/12* (2006.01)
  *H04N 21/2343* (2011.01)
  *H04N 21/238* (2011.01)
  *H04N 21/24* (2011.01)
  *H04N 21/234* (2011.01)

(52) U.S. Cl.
  CPC ............ *H04N 21/234363* (2013.01); *H04N 21/23805* (2013.01); *H04N 21/234381* (2013.01); *H04N 21/2402* (2013.01); *H04N 21/23418* (2013.01)

(58) Field of Classification Search
  CPC ..... H04N 21/23418; H04N 21/234363; H04N 21/234381; H04N 21/23805; H04N 21/2402
  See application file for complete search history.

(56) References Cited

U.S. PATENT DOCUMENTS

| 2011/0002381 A1* | 1/2011 | Yang | H04N 19/172 375/240.03 |
| 2013/0138829 A1* | 5/2013 | Bulava | H04L 65/608 709/231 |
| 2015/0172680 A1* | 6/2015 | Zhou | H04N 19/14 375/240.06 |

OTHER PUBLICATIONS

T. Wiegand, G.J. Sullivan, G. Bjøntegaard, and A. Luthra, "Overview of the H.264/AVC Video Coding Standard", IEEE Transactions on Circuits and Systems for Video Technology, vol. 13, No. 7, Jul. 2003, pp. 560-576.

(Continued)

*Primary Examiner* — Jessica M Prince
(74) *Attorney, Agent, or Firm* — BainwoodHuang

(57) ABSTRACT

Improved systems and methods of performing multimedia communications over multimedia communications networks, in which video data senders can maintain high video quality of experience (QoE) levels with increased reliability despite changes in available bandwidths of video data receivers. In the disclosed systems and methods, video encoding parameters employed by the video data senders, including at least the video frame size and/or the video frame rate, can be dynamically adapted to the available bandwidths of the video data receivers, taking into account possible effects of spatial scaling and/or temporal scaling of video frames on the resulting video QoE.

19 Claims, 5 Drawing Sheets

(56) References Cited

OTHER PUBLICATIONS

RTP Payload Format for VP8 Video, http://tools.ietf.org/pdf/draft-ietf-payload-vp8-13.pdf, Oct. 4, 2013.
RTP: A Transport Protocol for Real-Time Applications, http://tools.ietf.org/pdf/rfc3550.pdf, Jul. 2003.
M. Hiromoto, H. Tsutsui, H. Ochi, T. Osano, N. Ishikawa, Y. Nakamura, "Dynamic Rate Control for Media Streaming in High-Speed Mobile Networks", Proc. Wireless Communications and Networking Conference, Apr. 2009.
J-Y Chen, C-W Chiu, G-L Li, and M-J Chen, "Burst-Aware Dynamic Rate Control for H.264/AVC Video Streaming", IEEE Transactions on Broadcasting, vol. 57, Issue 1, Mar. 2011, pp. 89-93.
H. Roodaki, K. Ugur, M. M. Hannuksela, and M. Gabbouj, "Efficient video resolution adaptation using scalable H.265/HEVC," Proc. of IEEE International Conference on Image Processing (ICIP), Sep. 2013.
"Extended RTP Profile for Real-Time Transport Control Protocol (RTCP)-Based Feedback (RTP/AVPF)", http://tools.ietf.org/pdf/rfc4585.pdf, Jul. 2006.
"Support for Reduced-Size Real-Time Transport Control Protocol (RTCP): Opportunities and Consequences", http://tools.ietf.org/pdf/rfc5506.pdf, Apr. 2009.
ITU-T, Recommendation H.265 (Apr. 2013), Series H: Audiovisual and Multimedia Systems, Infrastructure of audiovisual services—Coding of Moving Video, High Efficiency Video Coding, Online: http://www.itu.int/rec/T-REC-H.265-201304-I.
Wang, Yong, Shih-Fu Chang, and Alexander C. Loui. "Subjective preference of spatio-temporal rate in video adaptation using multi-dimensional scalable coding." Multimedia and Expo, 2004. ICME'04. 2004 IEEE International Conference on. vol. 3. IEEE, 2004.
T. Davies, "Resolution Switching for Coding Efficiency and Resilience", Technical Report JCTVC-F158, Jul. 2011.

\* cited by examiner

EFFICIENT APPROACH TO DYNAMIC FRAME SIZE AND FRAME RATE ADAPTATION

CROSS REFERENCE TO RELATED APPLICATIONS

This application is a Continuation of U.S. patent application Ser. No. 14/674,348 filed Mar. 31, 2015 entitled EFFICIENT APPROACH TO DYNAMIC FRAME SIZE AND FRAME RATE ADAPTATION.

TECHNICAL FIELD

The present application relates generally to multimedia communications performed over the Internet and/or other wired and/or wireless multimedia communications network(s), and more specifically to systems and methods of dynamically adapting video encoding parameters employed by multimedia data senders to available bandwidths of multimedia data receivers participating in such multimedia communications.

BACKGROUND

In recent years, multimedia communications over the Internet and/or other wired and/or wireless multimedia communications network(s) have gained increased popularity. Such multimedia communications can be performed within the context of video communications systems, such as video conferencing systems, video calling systems, video transcoding systems, video playback systems, interactive voice and video response (IVVR) systems, etc. In video communications, transmissions of video data from video data senders are typically based on the real-time transport protocol (RTP), and deliveries of such video data to video data receivers are typically monitored using the real-time transport control protocol (RTCP). For example, such video data receivers that receive video data in the form of RTP packets from one or more video data senders can provide reception quality feedback information to the respective video data senders in one or more RTCP report packets. Further, such video data senders can estimate available bandwidths of the respective video data receivers using at least the reception quality feedback information provided in the RTCP report packets, and, if desired and/or required, adjust their video data transmit rates so as not to exceed the estimated available bandwidths of the video data receivers.

Such multimedia communications can be problematic, however, particularly when transmissions of multimedia data including video data are performed over multimedia communications networks such as the Internet. For example, while the video data senders transmit video data over the Internet, various participants in the video communications may be subjected to varying levels of network congestion, which can result in changes in the available bandwidths of at least some of the video data receivers. Such network congestion that results in changes in the available bandwidths of the video data receivers can be caused by increases and/or decreases in bandwidths employed by other participants in the video communications, changes in physical locations of mobile participants in the video communications, certain errors occurring within the multimedia communications network, etc. Moreover, if the video data senders transmit video data at transmit rates that exceed the available bandwidths of one or more of the video data receivers, then the respective video data receivers may experience increased packet losses. Alternatively, if the video data senders transmit video data at transmit rates that are below the available bandwidths of one or more of the video data receivers, then reduced video quality may be exhibited at the respective video data receivers. In either case, the video quality of experience (QoE) may be degraded for at least some of the video data receivers participating in the video communications.

It would therefore be desirable to have improved systems and methods of performing multimedia communications over multimedia communications networks, in which video data senders can more reliably maintain high video QoE levels despite changes in available bandwidths of video data receivers.

SUMMARY

In accordance with the present application, improved systems and methods of performing multimedia communications over multimedia communications networks are disclosed, in which video data senders can maintain high video quality of experience (QoE) levels with increased reliability despite changes in available bandwidths of video data receivers. In the disclosed systems and methods, video encoding parameters employed by the video data senders, including at least a video frame size and/or a video frame rate, can be dynamically adapted to the available bandwidths of the video data receivers, taking into account possible effects of spatial scaling and/or temporal scaling of video frames on the resulting video QoE.

In one aspect, a system for dynamically adapting video encoding parameters to available bandwidths of video data receivers includes a video data sender communicably coupleable to one or more video data receivers over at least one communications network, such as the Internet. For example, the system may be a video conferencing system, a video calling system, a video transcoding system, a video playback system, an interactive voice and video response (IVVR) system, or any other suitable video communications system. The system is operative to perform transmissions of multimedia data including video data over the communications network based on the real-time transport protocol (RTP) or any other suitable protocol, and to monitor deliveries of such video data using the real-time transport control protocol (RTCP) or any other suitable protocol. For example, the video data sender can send such video data to a respective video data receiver in the form of RTP packets (e.g., video, audio, and/or data RTP packets), and the respective video data receiver can provide reception quality feedback information to the video data sender in the form of RTCP report packets (e.g., RTCP sender report (SR) packets, RTCP receiver report (RR) packets).

The video data sender includes a bandwidth estimator for obtaining estimates of the available bandwidths of the video data receivers, a video encoding parameter adaptation component, and a video encoder. Having sent one or more RTP packets to a respective video data receiver, the video data sender can receive one or more RTCP report packets containing reception quality feedback information from the respective video data receiver. The bandwidth estimator can then (1) calculate, generate, determine, or otherwise obtain one or more bandwidth estimation parameters, such as at least a packet loss ratio and/or a round trip delay, from the reception quality feedback information, (2) calculate, generate, determine, or otherwise obtain an estimate of the available bandwidth of the respective video data receiver using at least the bandwidth estimation parameters, and (3)

calculate, generate, determine, or otherwise obtain a target bitrate of encoded video so as not to exceed the estimated available bandwidth of the respective video data receiver.

In an exemplary aspect, the video encoding parameter adaptation component is operative, for each of a plurality of scaled video frame size and scaled video frame rate pairs (also referred to herein as the "scaled frame size/frame rate pair(s)"), to calculate, generate, determine, or otherwise obtain a fair quality bitrate of the encoded video provided by the video data sender, as well as a scaling penalty that takes into account the possible effects of spatial scaling and/or temporal scaling of the video frames on the resulting video QoE. For example, a total of "N" predetermined spatial scaling factors can be provided for scaling a target video frame size, and a total of "M" predetermined temporal scaling factors can be provided for scaling a target video frame rate, resulting in a set of N×M scaled frame size/frame rate pairs. The fair quality bitrate is defined herein as the bitrate at which the video data sender can transmit encoded video to the video data receiver such that an acceptable video quality is exhibited at the video data receiver without significant video quality degradation. The scaling penalty is defined herein to be a function of at least (1) the original video frame resolution (i.e., width×height), (2) the resolution of the last or previous video frame encoded by the video encoder, and (3) the complexity of the content of the video data (also referred to herein as the "video content complexity"), which is further defined herein to include one or more of the spatial complexity, the temporal complexity, and the motion complexity of the video data content.

Having obtained the fair quality bitrate and the scaling penalty for each of the N×M scaled frame size/frame rate pairs, the video encoding parameter adaptation component can calculate, generate, determine, or otherwise obtain a score value for the respective scaled frame size/frame rate pair. Such a score value is defined herein to be a function of at least (1) the absolute value of the difference between the fair quality bitrate and the target bitrate of the encoded video, and (2) the scaling penalty. In a further exemplary aspect, the video encoding parameter adaptation component can obtain the score value by calculating, generating, determining, or otherwise obtaining the reciprocal of the product of the scaling penalty and the absolute value of the difference between the fair quality bitrate and the target bitrate. Further, the video encoding parameter adaptation component can compare the score values for the respective scaled frame size/frame rate pairs to identify the scaled frame size/frame rate pair having the maximum score value, and obtain, from the identified scaled frame size/frame rate pair, scaled frame size/frame rate values that the video data sender can use to provide encoded video having a resolution and bitrate closest to the target resolution and bitrate. The video encoding parameter adaptation component can then provide the scaled frame size/frame rate values specified by the identified scaled frame size/frame rate pair for subsequent reconfiguration of the video encoder.

By dynamically adapting video encoding parameters employed by video data senders, including at least a video frame size and/or a video frame rate, to available bandwidths of video data receivers, taking into account possible effects of spatial scaling and/or temporal scaling of video frames on the resulting video quality of experience (QoE), such video data senders can advantageously maintain high video QoE levels with increased reliability despite changes in the available bandwidths of the video data receivers.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings:

FIG. 2b is a diagram illustrating an exemplary region of interest within domains defined by the number of bits per macroblock of encoded video and the quantization step size of the encoded video, for use in obtaining a complexity of video content by the video encoding parameter adaptation component of FIG. 2a.

DETAILED DESCRIPTION

The disclosure of U.S. patent application Ser. No. 14/674,348 filed Mar. 31, 2015 entitled EFFICIENT APPROACH TO DYNAMIC FRAME SIZE AND FRAME RATE ADAPTATION is hereby incorporated herein by reference in its entirety.

Improved systems and methods of performing multimedia communications over multimedia communications networks are disclosed, in which video data senders can maintain high video quality of experience (QoE) levels with increased reliability despite changes in available bandwidths of video data receivers. In the disclosed systems and methods, video encoding parameters employed by the video data senders, including at least a video frame size and/or a video frame rate, can be dynamically adapted to the available bandwidths of the video data receivers, taking into account possible effects of spatial scaling and/or temporal scaling of video frames on the resulting video QoE.

Figure 1:
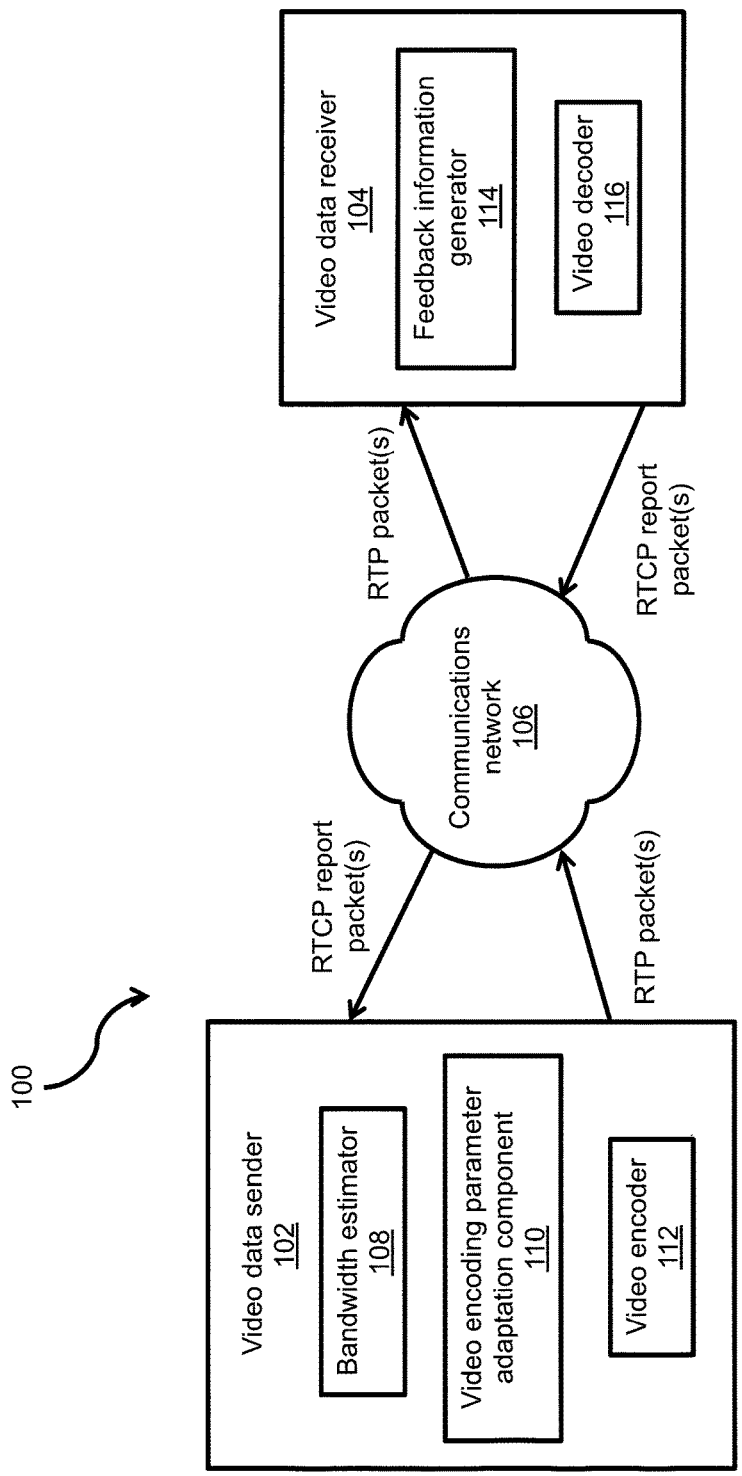
FIG. 1 is a block diagram of an exemplary multimedia communications system, including an exemplary video data sender communicably coupleable to an exemplary video data receiver over an exemplary communications network, in accordance with the present application.

FIG. 1 depicts an illustrative embodiment of an exemplary multimedia communications system 100, including an exemplary video data sender 102 communicably coupleable to an exemplary video data receiver 104 over an exemplary communications network 106, in accordance with the present application. For example, the multimedia communications system 100 can be a video conferencing system, a video calling system, a video transcoding system, a video playback system, an interactive voice and video response (IVVR) system, or any other suitable video communications system. Further, the communications network 106 can correspond to the Internet, and/or any other suitable combination of wired and/or wireless multimedia communications network(s). The multimedia communications system 100 is operative to perform transmissions of multimedia data including video data over the communications network 106 based on the real-time transport protocol (RTP) or any other suitable protocol, and to monitor deliveries of such video data using the real-time transport control protocol (RTCP) or any other suitable protocol. For example, the video data sender 102 can send such video data to the video data receiver 104 in the form of RTP packets (e.g., video, audio, and/or data RTP packets), and the video data receiver 104 can provide reception quality feedback information to the video data sender 102 in the form of RTCP report packets (e.g., RTCP sender report (SR) packets, RTCP receiver report (RR) packets).

As shown in FIG. 1, the video data sender 102 includes a bandwidth estimator 108 for obtaining an estimate of an available bandwidth of the video data receiver 104, a video encoding parameter adaptation component 110, and a video encoder 112. Having sent one or more RTP packets to the video data receiver 104, the video data sender 102 can receive one or more RTCP report packets containing reception quality feedback information from the video data receiver 104. The bandwidth estimator 108 can then (1) calculate, generate, determine, or otherwise obtain one or more bandwidth estimation parameters, such as at least a packet loss ratio and/or a round trip delay, from the reception quality feedback information, (2) calculate, generate, determine, or otherwise obtain an estimate of the available bandwidth of the video data receiver 104 using at least the bandwidth estimation parameters, and (3) calculate, generate, determine, or otherwise obtain a target bitrate of encoded video so as not to exceed the estimated available bandwidth of the video data receiver 104. As further shown in FIG. 1, the video data receiver 104 includes a feedback information generator 114 for generating the reception quality feedback information provided to the video data sender 102, as well as a video decoder 116. Such estimation of available bandwidths of video data receivers by video data senders is further described in co-pending U.S. patent application Ser. No. 14/186,205 filed Feb. 21, 2014 entitled AN EFFICIENT DYNAMIC BITRATE ADAPTATION IN VIDEO COMMUNICATIONS OVER IP NETWORKS, the disclosure of which is hereby incorporated herein by reference in its entirety.

In the multimedia communications system 100 of FIG. 1, one or more encoding parameters of the video encoder 112, including at least a video frame size and/or a video frame rate, can be dynamically adapted to the estimated available bandwidth of the video data receiver 104. To that end, the video encoding parameter adaptation component 110 is operative, for each of a plurality of scaled video frame size and scaled video frame rate pairs (also referred to herein as the "scaled frame size/frame rate pair(s)"), to calculate, generate, determine, or otherwise obtain a fair quality bitrate of the encoded video provided by the video data sender 102, as well as a scaling penalty that takes into account possible effects of spatial scaling and/or temporal scaling of video frames on the resulting video QoE. For example, a total of "N" predetermined spatial scaling factors can be provided for scaling a target video frame size (such as 1280 pixels (width)×720 lines (height), or any other suitable frame size), and a total of "M" predetermined temporal scaling factors can be provided for scaling a target video frame rate (such as 30 frames per second (fps), or any other suitable frame rate), resulting in a set of N×M scaled frame size/frame rate pairs. The fair quality bitrate is defined herein as the bitrate at which the video data sender 102 can transmit encoded video to the video data receiver 104 such that an acceptable video quality is exhibited at the video data receiver 104 without significant video quality degradation. The scaling penalty is defined herein to be a function of at least (1) the original video frame resolution (i.e., width×height), (2) the resolution of the last or previous video frame encoded by the video encoder 112, and (3) the complexity of the content of the video data (also referred to herein as the "video content complexity"), which is further defined herein to include one or more of the spatial complexity, the temporal complexity, and the motion complexity of the video data content.

Having obtained the fair quality bitrate and the scaling penalty for each of the N×M scaled frame size/frame rate pairs, the video encoding parameter adaptation component 110 can calculate, generate, determine, or otherwise obtain a score value for the respective scaled frame size/frame rate pair. Such a score value is defined herein to be a function of at least (1) the absolute value of the difference between the fair quality bitrate and the target bitrate of the encoded video, and (2) the scaling penalty. In one embodiment, the video encoding parameter adaptation component 110 can obtain the score value by calculating, generating, determining, or otherwise obtaining the reciprocal of the product of the scaling penalty and the absolute value of the difference between the fair quality bitrate and the target bitrate. Further, the video encoding parameter adaptation component 110 can compare the score values for the respective scaled frame size/frame rate pairs to identify the scaled frame size/frame rate pair having a score value that satisfies a predetermined condition (such as the predetermined condition of being the maximum score value), and obtain, from the identified scaled frame size/frame rate pair, scaled frame size/frame rate values that the video data sender 102 can use to provide encoded video having a resolution and bitrate closest to the target resolution and bitrate. The video encoding parameter adaptation component 110 can then provide the scaled frame size/frame rate values specified by the identified scaled frame size/frame rate pair for subsequent reconfiguration of the video encoder 112.

Figure 2A:
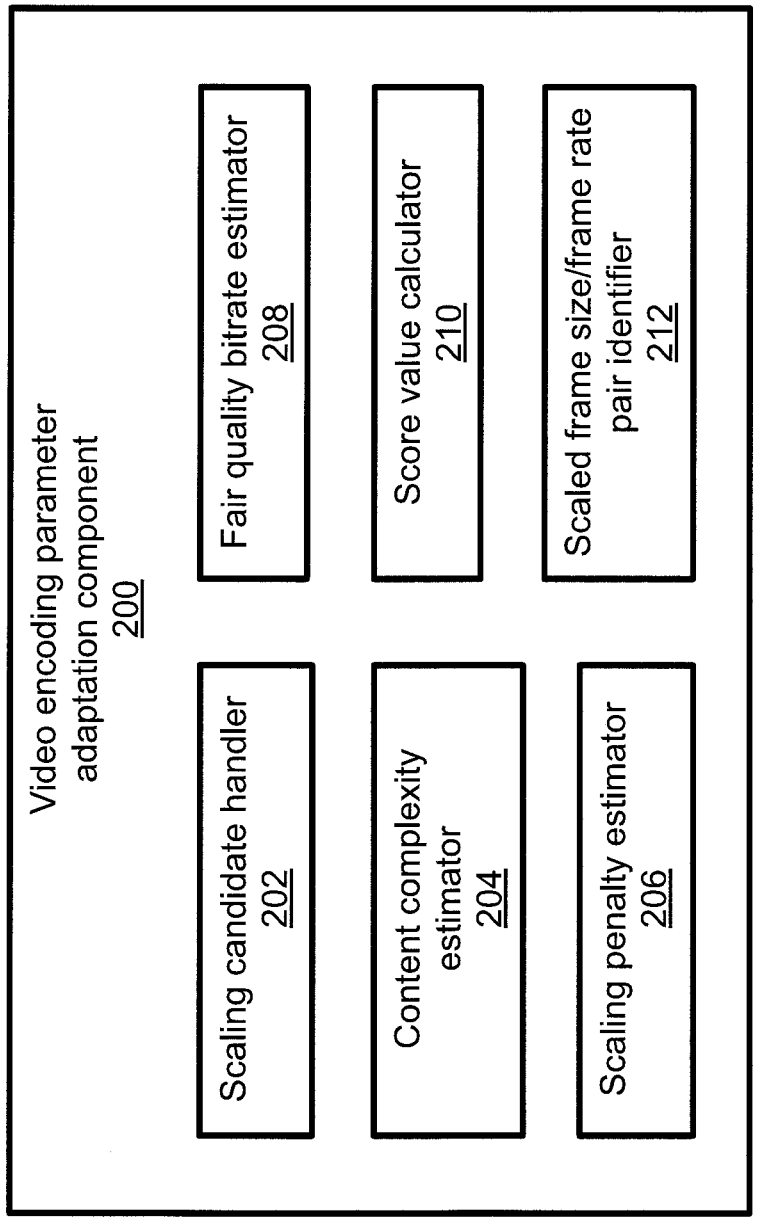
FIG. 2a is a block diagram of an exemplary video encoding parameter adaptation component included in the video data sender of FIG. 1.

FIG. 2a depicts an illustrative embodiment (referred to herein by reference numeral 200) of the video encoding parameter adaptation component 110 of FIG. 1. As shown in FIG. 2a, the video encoding parameter adaptation component 200 includes a plurality of functional modules, including at least a scaling candidate handler 202, a content complexity estimator 204, a scaling penalty estimator 206, a fair quality bitrate estimator 208, a score value calculator 210, and a scaled frame size/frame rate pair identifier 212. As described herein, a total of "N" predetermined spatial scaling factors can be provided for scaling the target video frame size, and a total of "M" predetermined temporal scaling factors can be provided for scaling the target video frame rate, resulting in the set of N×M scaled frame size/frame rate pairs. Accordingly, a set of N×M predetermined scaling factors (also referred to herein as the "scaling_factor_set"; see equation (1)) can be defined, as follows:

$$\text{scaling\_factor\_set} = \{\text{scaling\_factor}_{nm} | n=0, 1, \ldots, N-1; m=0, 1, \ldots, M-1\}, \quad (1)$$

in which "N" and "M" can each be set to any suitable positive integer value. For purposes of illustration, N and M are set herein to be equal to 5 and 6, respectively. Further, "scaling_factor$_{nm}$" (see equation (1)) can be defined, as follows:

$$\text{scaling\_factor}_{nm} = (\text{scaling\_factor\_size}_n, \text{scaling\_factor\_rate}_m), \quad (2)$$

in which "scaling_factor_size$_n$" corresponds to an $n^{th}$ one of the N predetermined spatial scaling factors for scaling the target video frame size, and "scaling_factor_rate$_m$" corresponds to an $m^{th}$ one of the M predetermined temporal scaling factors for scaling the target video frame rate.

For example, the N (e.g., N=5) predetermined spatial scaling factors for scaling the target video frame size can be 1.000 (i.e., 1:1), 0.750 (i.e., 3:4), 0.500 (i.e., 1:2), 0.375 (i.e., 3:8), and 0.250 (i.e., 1:4), or any other suitable scaling factors. Further, the M (e.g., M=6) predetermined temporal scaling factors for scaling the target video frame rate can be 1.000 (i.e., 1:1), 0.667 (i.e., 2:3), 0.500 (i.e., 1:2), 0.333 (i.e., 1:3), 0.250 (i.e., 1:4), and 0.167 (i.e., 1:6), or any other suitable scaling factors. Such exemplary scaling factors for the target video frame size (n=0, 1, ..., N−1) and the target video frame rate (m=0, 1, ..., M−1) are provided in TABLE I below.

TABLE I

EXEMPLARY SCALING FACTORS

| | m = 0 | 1 | 2 | 3 | 4 | 5 (i.e., M − 1) |
|---|---|---|---|---|---|---|
| n = 0 | {1.000, 1.000} | {1.000, 0.667} | {1.000, 0.500} | {1.000, 0.333} | {1.000, 0.250} | {1.000, 0.167} |
| 1 | {0.750, 1.000} | {0.750, 0.667} | {0.750, 0.500} | {0.750, 0.333} | {0.750, 0.250} | {0.750, 0.167} |
| 2 | {0.500, 1.000} | {0.500, 0.667} | {0.500, 0.500} | {0.500, 0.333} | {0.500, 0.250} | {0.500, 0.167} |
| 3 | {0.375, 1.000} | {0.375, 0.667} | {0.375, 0.500} | {0.375, 0.333} | {0.375, 0.250} | {0.375, 0.167} |
| 4 (i.e., N − 1) | {0.250, 1.000} | {0.250, 0.667} | {0.250, 0.500} | {0.250, 0.333} | {0.250, 0.250} | {0.250, 0.167} |

To obtain each of the N scaled video frame sizes (also referred to herein as the "scaled_frame_size$_n$"; see equation (3)), the scaling candidate handler 202 (see FIG. 2a) is operative to calculate, generate, determine, or otherwise obtain the product of the target video frame size (also referred to herein as the "target_frame_size"; see equation (3)) and a corresponding n$^{th}$ one of the N (e.g., N=5) predetermined spatial scaling factors (also referred to herein as the "scaling_factor_size$_n$"; see equation (3)) for scaling the target video frame size, as follows:

$$\text{scaled\_frame\_size}_n = \text{target\_frame\_size} * \text{scaling\_factor\_size}_n. \quad (3)$$

It is noted that the scaling candidate handler 202 can preserve the aspect ratio for a respective video frame by applying the same spatial scaling_factor to both the target width (e.g., 1280 pixels) and the target height (e.g., 720 lines) of the respective video frame.

Likewise, to obtain each of the M scaled video frame rates (also referred to herein as the "scaled_frame_rate$_m$"; see equation (4)), the scaling candidate handler 202 can calculate, generate, determine, or otherwise obtain the product of the target video frame rate (also referred to herein as the "target_frame_rate"; see equation (4)) and a corresponding m$^{th}$ one of the M (e.g., M=6) predetermined temporal scaling factors (also referred to herein as the "scaling_factor_rate$_m$"; see equation (4)) for scaling the target video frame rate (e.g., 30 fps), as follows:

$$\text{scaled\_frame\_rate}_m = \text{target\_frame\_rate} * \text{scaling\_factor\_rate}_m. \quad (4)$$

For example, the scaling candidate handler 202 can obtain the product of the target video frame size (e.g., 1280×720) and the 1$^{st}$ one (i.e., 0.750; n=1) of the N (i.e., N=5) predetermined spatial scaling factors for scaling the target video frame size, as follows:

$$\text{scaled\_frame\_size}_1 = (1280, 720) * 0.750 = (960, 540). \quad (5)$$

It is noted that the scaling candidate handler 202 can obtain the remaining 0$^{th}$, 2$^{nd}$, 3$^{rd}$, and 4$^{th}$ ones of the N predetermined spatial scaling factors for scaling the target video frame size in a similar fashion.

Further, the scaling candidate handler 202 can obtain the product of the target video frame rate (e.g., 30 fps) and the 1$^{st}$ one (i.e., 0.667; m=1) of the M (i.e., M=6) predetermined temporal scaling factors for scaling the target video frame rate, as follows:

$$\text{scaled\_frame\_rate}_1 = 30 \text{ fps} * 0.667 = 20 \text{ fps}. \quad (6)$$

It is noted that the scaling candidate handler 202 can obtain the remaining 0$^{th}$, 2$^{nd}$, 3$^{rd}$, 4$^{th}$, and 5$^{th}$ ones of the M predetermined temporal scaling factors for scaling the target video frame rate in a similar fashion. Accordingly, the scaled frame size/frame rate pair corresponding to the scaled_frame_size$_1$ (see equation (5)) and the scaled_frame_rate$_1$ (see equation (6)) contains the scaled video frame size values, 960 pixels (width), 540 lines (height), and the scaled video frame rate value, 20 fps.

A full set of N×M (n=0, 1, ..., N−1; m=0, 1, ..., M−1) scaled frame size/frame rate pairs (scaled_frame_size$_n$, scaled_frame_rate$_m$) for the target video frame size (e.g., 1280×720) and the target video frame rate (e.g., 30 fps) are provided in TABLE II below.

TABLE II

EXEMPLARY SCALED FRAME SIZE/FRAME RATE PAIRS

| | m = 0 | 1 | 2 | 3 | 4 | 5 (i.e., M − 1) |
|---|---|---|---|---|---|---|
| n = 0 | {1280, 720} 30 fps | {1280, 720} 20 fps | {1280, 720} 15 fps | {1280, 720} 10 fps | {1280, 720} 8 fps | {1280, 720} 6 fps |
| 1 | {960, 540} 30 fps | {960, 540} 20 fps | {960, 540} 15 fps | {960, 540} 10 fps | {960, 540} 8 fps | {960, 540} 6 fps |
| 2 | {640, 360} 30 fps | {640, 360} 20 fps | {640, 360} 15 fps | {640, 360} 10 fps | {640, 360} 8 fps | {640, 360} 6 fps |
| 3 | {480, 270} 30 fps | {480, 270} 20 fps | {480, 270} 15 fps | {480, 270} 10 fps | {480, 270} 8 fps | {480, 270} 6 fps |
| 4 (i.e., N − 1) | {320, 180} 30 fps | {320, 180} 20 fps | {320, 180} 15 fps | {320, 180} 10 fps | {320, 180} 8 fps | {320, 180} 6 fps |

It is noted that the scaling candidate handler 202 (see FIG. 2a) can adjust the values contained in the set of N×M scaled frame size/frame rate pairs (see TABLE II) to account for specific capabilities of the video encoder 112. For example, the video encoder 112 may be incapable of supporting video frame rates lower than 6 fps. Although the scaled_frame_rate$_5$ (i.e., m=5) may actually be equal to 5 fps (i.e., target_frame_rate (e.g., 30 fps)*scaling_factor_rate$_5$ (e.g., 0.167)=5 fps), the scaling candidate handler 202 can be configured to set the value of the scaled_frame_rate$_5$ (i.e., m=5) to 6 fps to account for the lower limit of the video frame rate supported by the video encoder 112, as illustrated in TABLE II. The scaling candidate handler 202 can also be configured to set the value of the scaled_frame_rate$_m$ to account for any upper limit of the video frame rate supported by the video encoder 112. Likewise, the scaling candidate handler 202 can be configured to set values of the scaled_frame_size$_n$ to account for any upper and/or lower limits of the video frame size supported by the video encoder 112.

As described herein, the video encoding parameter adaptation component 110 is operative, for each of the scaled frame size/frame rate pairs, to calculate, generate, determine, or otherwise obtain a fair quality bitrate of encoded video provided by the video data sender 102. The fair quality bitrate is further defined herein to be a function of at least the scaled_frame_size. (see equation (3)), the scaled_frame_rate$_m$ (see equation (4)), and the number of bits per macroblock (also referred to herein as "R") of the encoded video, which, in turn, is a function of at least the video content complexity (also referred to herein as "$\sigma^2$").

The content complexity estimator 204 (see FIG. 2a) is operative to calculate, generate, determine, or otherwise obtain the number of bits per macroblock, R, of the encoded video as a function of at least the video content complexity, $\sigma^2$. In one embodiment, the content complexity estimator 204 can obtain the video content complexity, $\sigma^2$, as a function of at least the spatial (frame size) and/or temporal (frame rate) resolution of video frames encoded by the video encoder 112, the bitrate of the encoded video, and the quantization step size employed by the video encoder 112, as follows:

$$\sigma^2 = f(\text{frame\_size\_enc}, \text{frame\_rate\_enc}, \text{bitrate\_enc}, Q_{step}), \quad (7)$$

in which "frame_size_enc" is an encoding parameter corresponding to the video frame size (in macroblocks), "frame_rate_enc" is an encoding parameter corresponding to the video frame rate, "bitrate_enc" is the bitrate of the encoded video, and "$Q_{step}$" is the quantization step size of the encoded video. The quantization step size, $Q_{step}$, is defined herein to be a function of at least the codec type (e.g., H.263, H.264, VP8) and a quantization parameter (also referred to herein as "QP") employed by the video encoder 112, as follows:

$$Q_{step} = g(\text{codec\_type}, QP). \quad (8)$$

In one embodiment, the video content complexity, $\sigma^2$, as set forth in equation (7), can be defined in terms of a rate-distortion model, as follows:

$$\sigma^2 = \alpha^R * Q_{step}^2 * h(\text{frame\_size\_enc}) * i(\text{frame\_rate\_enc}), \quad (9)$$

in which (1) "$\alpha$" is a constant that can be set to 1.085 or any other suitable value, (2) "R" is the number of bits per macroblock of the encoded video, (3) "$Q_{step}^2$" is the square of the quantization step size ($Q_{step}$), which is representative of distortion in the encoded video, (4) "h(frame_size_enc)" is a predetermined function of the encoding parameter corresponding to the video frame size (in macroblocks), and (5) "i(frame_rate_enc)" is a predetermined function of the encoding parameter corresponding to the video frame rate. Further, the content complexity estimator 204 can calculate, generate, determine, or otherwise obtain the number of bits per macroblock, R, of a current encoded video frame (also referred to herein as "$R_{curr\_frame}$"), as follows:

$$R_{curr\_frame} = \text{bitrate\_enc} / (\text{frame\_size\_enc} * \text{frame\_rate\_enc}). \quad (10a)$$

The content complexity estimator 204 can also calculate, generate, determine, or otherwise obtain the quantization step size, $Q_{step}$, of the encoded video, as well as the number of bits per macroblock, R, of the encoded video, as follows:

$$Q_{step} = \rho * Q_{step\_curr} + (1-\rho) * Q_{step}, \text{ and} \quad (10b)$$

$$R = \rho * R_{curr\_frame} + (1-\rho) * R, \quad (10c)$$

in which "$Q_{step\_curr}$" is the quantization step size of the current encoded video frame, and "$\rho$" is a predetermined weighting value that can be applied to both the value of $Q_{step\_curr}$ (see equation (10b)) and the value of $R_{curr\_frame}$ (see equation (10c)). For example, the predetermined weighting value, p, can be equal to 1/64, or any other suitable value. Accordingly, the quantization step size, $Q_{step}$ (see equation (10b)), of the encoded video can be calculated or updated as a weighted average of the quantization step size, $Q_{step\_curr}$, of the current encoded video frame and the quantization step size, $Q_{step}$, of a previous encoded video frame; and, the number of bits per macroblock, R (see equation (10c)), of the encoded video can be calculated or updated as a weighted average of the number of bits per macroblock, $R_{curr\_frame}$, of the current encoded video frame and the number of bits per macroblock, R, of the previous encoded video frame.

In addition, the predetermined function, h(frame_size_enc) (see equation (9)), of the encoding parameter corresponding to the video frame size can be modeled, as follows:

$$h(\text{frame\_size\_enc}) = 1 + \sqrt{(\text{frame\_size\_enc})}, \quad (11)$$

in which "$\sqrt{(\text{frame\_size\_enc})}$" represents the square root of frame_size_enc. In addition, the predetermined function, i(frame_rate_enc) (see equation (9)), of the encoding parameter corresponding to the video frame rate can be modeled, as follows:

$$i(\text{frame\_rate\_enc}) = 1 + \sqrt{(\text{frame\_rate\_enc})}, \quad (12)$$

in which "$\sqrt{(\text{frame\_rate\_enc})}$" represents the square root of frame_rate_enc. It is noted that a sequence of video frames that is encoded at a video frame resolution (i.e., width×height) less than that of an original video frame sequence typically exhibits a lower correlation among pixels in the video frames compared to pixels in the video frames of the original video frame sequence. Likewise, a video frame sequence that is encoded at a video frame rate less than that of an original video frame sequence typically exhibits a lower correlation between adjacent video frames compared to adjacent video frames of the original video frame sequence. In each case, such reduced correlation among the pixels in the video frames of the scaled video frame sequence can result in an increase in the number of bits per macroblock, R, of the encoded video for the same quantization step size, $Q_{step}$, used to encode the video frames. To account for such possible increases in the number of bits per macroblock, R, of the encoded video due to a reduced correlation among the pixels in the video frames of the scaled video frame sequence, the predetermined functions, h(frame_size_enc) (see equation (11)) and i(frame_rate_enc) (see equation (12)), are provided as multiplicative factors in the expression for the video content complexity, $\sigma^2$, as defined herein in equation (9).

It is further noted that the rate-distortion model used to define the video content complexity, $\sigma^2$, as set forth in equation (9), may provide complexity information with reduced accuracy for certain upper and/or lower ranges of the number of bits per macroblock, R, of the encoded video, and/or the quantization step size, $Q_{step}$, of the encoded video. For this reason, the content complexity estimator 204 can be configured to employ the rate-distortion model set forth in equation (9) to obtain the video content complexity, $\sigma^2$, for a predetermined region of interest 220 in the R and $Q_{step}$ domains, and employ one or more modified rate-distortion models to obtain the video content complexity, $\sigma^2$, outside the predetermined region of interest 220 in the R and $Q_{step}$ domains.

Figure 2B:
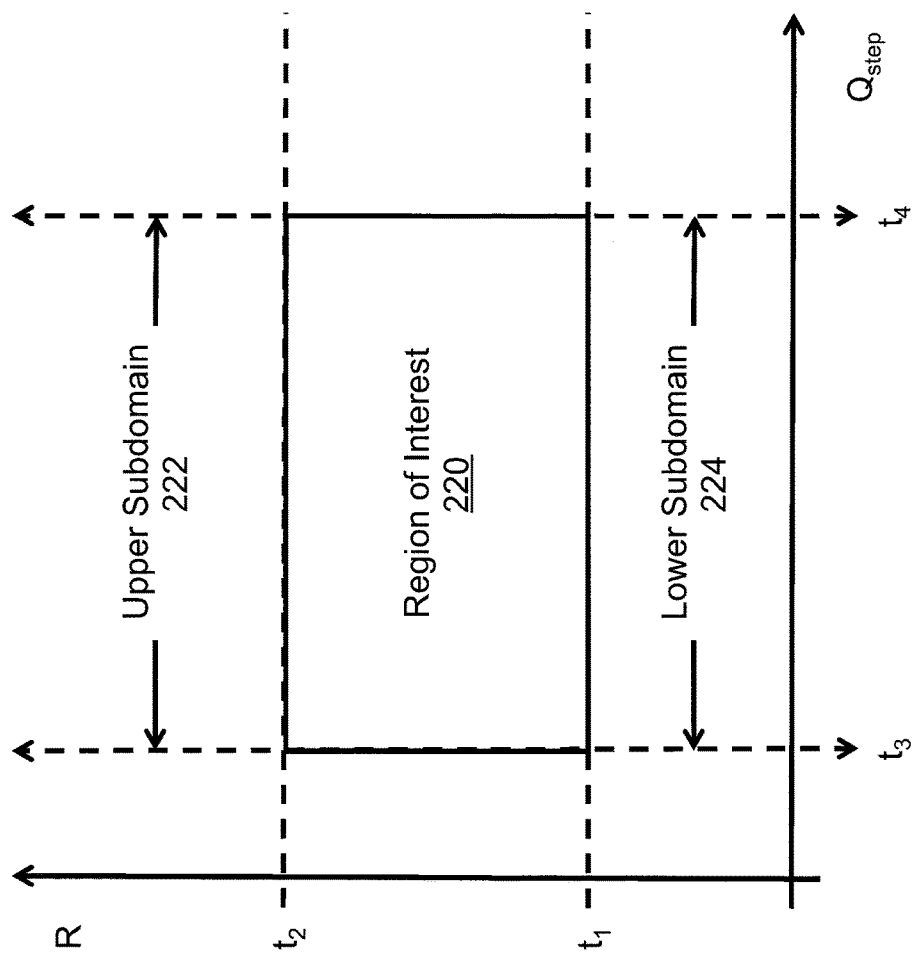

FIG. 2b depicts the predetermined region of interest 220 in the domains defined by the number of bits per macroblock, R, of the encoded video, and the quantization step size, $Q_{step}$, of the encoded video, for use by the content complexity estimator 204 in obtaining the video content complexity, $\sigma^2$, with increased accuracy. It is noted that the dimensions of the region of interest 220, as defined by a pair of boundary values $t_1$, $t_2$, along the R axis and a pair of boundary values $t_3$, $t_4$ along the $Q_{step}$ axis, can be made to adaptively change based at least on the video content complexity, $\sigma^2$. For example, such boundary values $t_1$, $t_2$, and $t_3$, $t_4$, can each be empirically determined based on data obtained from simulations. The region of interest 220 can include multiple sub-regions of interest (not shown), each defined by additional boundary values along the R and $Q_{step}$ axes to further increase the accuracy of the video content complexity, $\sigma^2$, obtained by the content complexity estimator 204. The content complexity estimator 204 can also employ the region of interest 220 as a guide for determining whether the video encoder 112 is currently operating in a desired range(s) of R and/or $Q_{step}$ for maintaining a high level of video quality of experience (QoE), and/or whether one or more video encoding parameters such as the video frame size and/or the video frame rate might be dynamically adapted to achieve such a high level of QoE.

In one embodiment, the content complexity estimator 204 can calculate, generate, determine, or otherwise obtain the boundary values $t_1$, $t_2$, defining the region of interest 220 (see FIG. 2b) along the R axis, as follows:

$$t_1 = \delta*(1 + 2*j(\sigma^2)), \text{ and} \tag{13}$$

$$t_2 = \lambda*(1 + 2*j(\sigma^2)), \tag{14}$$

in which "$\delta$" is a constant that can be set to 12.00 or any other suitable value, "$\lambda$" is a constant that can be set to 24.00 or any other suitable value, and "$j(\sigma^2)$" is a predetermined function of the video content complexity, $\sigma^2$. In one embodiment, the predetermined function, $j(\sigma^2)$, can be modeled, as follows:

$$j(\sigma^2) = \begin{cases} \frac{\sigma^2}{T_1}, & \sigma^2 < T_1 \\ 1, & \sigma^2 \geq T_1 \end{cases}, \tag{15}$$

in which "$T_1$" is a constant that can be set to 500,000 or any other suitable value.

The content complexity estimator 204 can further calculate, generate, determine, or otherwise obtain the boundary values $t_3$, $t_4$, defining the region of interest 220 along the $Q_{step}$ axis (see FIG. 2b), as follows:

$$t_3 = \mu*(1 + 2*k(\sigma^2)), \text{ and} \tag{16}$$

$$t_4 = \omega*(1 + 2*k(\sigma^2)), \tag{17}$$

in which "$\mu$" is a constant that can be set to 8.00 or any other suitable value, "$\omega$" is a constant that can be set to 20.00 or any other suitable value, and "$k(\sigma^2)$" is a predetermined function of the video content complexity, $\sigma^2$. In one embodiment, the predetermined function, $k(\sigma^2)$, can be modeled, as follows:

$$k(\sigma^2) = \begin{cases} \frac{\sigma^2}{T_2}, & \sigma^2 < T_2 \\ 2, & \sigma^2 \geq T_2 \end{cases}, \tag{18}$$

in which "$T_2$" is a constant that can be set to 750,000 or any other suitable value. Within the region of interest 220 (see FIG. 2) defined by the boundary values $t_1$, $t_2$, and $t_3$, $t_4$, the content complexity estimator 204 can obtain the video content complexity, $\sigma^2$, in accordance with equation (9). It is noted, however, that, in equation (9), the number of bits per macroblock, R, of the encoded video is an exponent of the constant, a. The video content complexity, $\sigma^2$, as defined herein in equation (9), can therefore increase abruptly with increasing values of R, and can also be much smaller than the actual video content complexity for small values of R, resulting in video content complexity values that might be less accurate for large values of R (e.g., R>$t_2$; see FIG. 2b), as well as for small values of R (e.g., R<$t_1$; FIG. 2b).

To increase the accuracy of video content complexity calculations for such large values of R (e.g., R>$t_2$; see FIG. 2b), the content complexity estimator 204 can obtain the video content complexity, $\sigma^2$, within an exemplary upper subdomain region 222 (see FIG. 2b) outside the region of interest 220 in the R and $Q_{step}$ domains, as follows:

$$\sigma^2 = (\alpha^{t2} + \gamma*(R - t_2))*Q_{step}^2*h(\text{frame\_size\_enc})* i(\text{frame\_rate\_enc}), \tag{19}$$

in which "$\gamma$" is a constant that can be set to 0.8 or any other suitable value. As shown in FIG. 2b, the upper subdomain region 222 is defined by the boundary value, $t_2$, along the R axis, and the boundary values, $t_3$, $t_4$, along the $Q_{step}$ axis, but is unbounded for values of R greater than $t_2$. It is noted that, in equation (19), the number of bits per macroblock, R, of the encoded video is not an exponent of the constant, $\alpha$, or any other term of equation (19).

To increase the accuracy of video content complexity calculations for such small values of R (e.g., R<$t_1$; FIG. 2b), the content complexity estimator 204 can obtain the video content complexity, $\sigma^2$, within an exemplary lower subdomain region 224 (see FIG. 2b) outside the region of interest 220 in the R and $Q_{step}$ domains, as follows:

$$\sigma^2 = \alpha^{t1}*\beta^{(R-t1)}*Q_{step}^2*h(\text{frame\_size\_enc})*i(\text{frame\_rate\_enc}), \tag{20}$$

in which "$\beta$" is a constant that can be set to 1.15, or any other suitable value greater than the value of the constant, $\alpha$. As shown in FIG. 2b, the lower subdomain region 224 is defined by the boundary value, $t_1$, along the R axis, and the boundary values, $t_3$, $t_4$, along the $Q_{step}$ axis, but is unbounded for values of R less than $t_1$. It is noted that, in equation (20), the difference between the number of bits per macroblock, R, of the encoded video and the boundary value, $t_1$, is an exponent of the constant, $\beta$, thereby reducing the effect of such small values of R on the video content complexity calculations performed in accordance with equation (20).

Moreover, to increase the robustness of such video content complexity calculations, the content complexity estimator 204 can detect or otherwise determine whether a scene change has occurred in a sequence of video frames, and, if it is determined that such a scene change has occurred, then increase the weighting value, ρ, applied to the quantization step size, $Q_{step\_curr}$ (see equation (10b)), of the current encoded video frame, as well as the number of bits per macroblock, $R_{curr\_frame}$ (see equation (10c)), of the current encoded video frame. For example, the weighting value, ρ, can be increased from 1/64 to 0.5, or any other suitable value. By increasing the weighting value, ρ, applied to the quantization step size, $Q_{step\_curr}$ (see equation (10b)), and the number of bits per macroblock, $R_{curr\_frame}$ (see equation (10c)), the contribution of the quantization step size, $Q_{step}$, of the encoded video in the determination of $Q_{step}$ (see equation (10b)), as well as the contribution of the number of bits per macroblock, R, of the encoded video in the determination of R (see equation (10c)), are each decreased. Further, the contribution of the quantization step size, $Q_{step\_curr}$, of the current encoded video frame in the determination of $Q_{step}$ (see equation (10b)), as well as the number of bits per macroblock, $R_{curr\_frame}$, of the current encoded video frame in the determination of R (see equation (10c)), are each increased. In this way, such contributions of the quantization step size, $Q_{step}$, and the number of bits per macroblock, R, of the encoded video from an earlier scene prior to the detected scene change can each be reduced in the determination of the video content complexity, $\sigma^2$ (see equation (9)).

To further increase the robustness of such video content complexity calculations, if it is determined that a scene change has not occurred, the content complexity estimator 204 can detect or otherwise determine whether the current encoded video frame is an inter-frame (e.g., P-frame, B-frame). If it is determined that the current encoded video frame is an inter-frame, then the content complexity estimator 204 can take into account the video quality of at least one reference frame for the detected inter-frame while determining the video content complexity, $\sigma^2$. For example, the content complexity estimator 204 can determine the video quality of such a reference frame based at least on the quantization parameter(s) (QP) used to encode the reference frame. If the QP value(s) for the reference frame is/are relatively high, then the video quality of the reference frame can be determined to be "bad". Otherwise, if the QP value(s) is/are relatively low, then the video quality of the reference frame can be determined to be "good". It is noted that a reference frame with a bad video quality can lead to increased temporal prediction errors for at least the next few inter-frames in a video frame sequence, resulting in video complexity values for the respective inter-frames that can be larger than the actual video content complexity values.

In one embodiment, the content complexity estimator 204 can determine the average QP used to encode a plurality of macroblocks of a current reference frame (also referred to herein as "$QP_{ref\_avg}$"), as well as the average QP used to encode macroblocks of one or more previously used reference frames (also referred to herein as "$QP_{ref\_avg\_prev}$"). If the value of $QP_{ref\_avg}$ is different from the value of $QP_{ref\_avg\_prev}$ (e.g., if the value of $QP_{ref\_avg}$ is greater than the value of $QP_{ref\_avg\_prev}$ by a predetermined amount), then the content complexity estimator 204 can modify the weighting value, ρ, applied to the quantization step size, $Q_{step\_curr}$ (see equation (10b)), and the number of bits per macroblock, $R_{curr\_frame}$ (see equation (10c)), as follows:

$$\rho(QP_{ref\_diff}) = \rho_0 * \eta(QP_{ref\_diff}), \quad (21)$$

in which "ρ" is defined to be a function of "$QP_{ref\_diff}$", which is equal to the absolute value of the difference between the values of $QP_{ref\_avg}$ and $QP_{ref\_avg\_prev}$; "$\rho_0$" is a constant that can be set to 1/64 or any other suitable value; and, "η" is likewise defined to be a function of $QP_{ref\_diff}$, as follows:

$$\eta(QP_{ref\_diff}) = \begin{cases} 1.0, & QP_{ref\_diff} < T_3 \\ 1.0 - 0.5 * (QP_{ref\_diff} - T_3)/(T_4 - T_3), & T_3 \leq QP_{ref\_diff} \leq T_4 \\ 0.5 & QP_{ref\_diff} > T_4 \end{cases}. \quad (22)$$

It is noted that, for the codec type VP8, "T3" and "T4" in equation (22) can be set to 4.0 and 20.0, respectively, or any other suitable values.

It is further noted that the content complexity estimator 204 can employ different values for the encoding parameters (e.g., bitrate_enc, frame_size_enc, frame_rate_enc, $Q_{step}$) used to obtain the video content complexity, $\sigma^2$, based on whether a current video frame is an intra-frame (e.g., I-frame) or an inter-frame (e.g., P-frame, B-frame). In this way, the content complexity estimator 204 can account for increased video content complexity values that can result from the presence of an I-frame in a video sequence, as well as general differences in the frame characteristics of I-frames, P-frames, and/or B-frames.

In a further embodiment, a target quantization step size of encoded video (also referred to herein as "$Q_{step\_target}$") can be defined to be a function of at least the video content complexity, $\sigma^2$, and the encoding parameter corresponding to the video frame rate, frame_rate_enc, as follows:

$$Q_{step\_target} = m(\sigma^2, \text{frame\_rate\_enc}). \quad (23)$$

In this further embodiment, the function, "$m(\sigma^2, \text{frame\_rate\_enc})$" (see equation (23)), can be implemented as a lookup table, which can be determined using a number of standard video test sequences such as those identified as "Mother and Daughter", "Akiyo", "Walking", and "Big Buck Bunny". For example, the target quantization step size, $Q_{step\_target}$, of the encoded video can have a value of 15 for each of the standard video test sequences identified as "Mother and Daughter" and "Akiyo", both of which are known to have relatively low video content complexity. Further, the target quantization step size, $Q_{step\_target}$, of the encoded video can have values of 24 and 20 for the standard video test sequences identified as "Walking" and "Big Buck Bunny", respectively, both of which are known to have higher video content complexities. Accordingly, in such a lookup table implementing the function, $m(\sigma^2, \text{frame\_rate\_enc})$ (see equation (23)), higher video content complexity values can correspond to increased $Q_{step\_target}$ values, while lower video content complexity values can correspond to reduced $Q_{step\_target}$ values.

Having obtained the target quantization step size, $Q_{step\_target}$, of the encoded video, in accordance with equation (23), the content complexity estimator 204 can calculate, generate, determine, or otherwise obtain the number of bits per macroblock, R, of the encoded video, as follows:

$$R = \log_\alpha(\sigma^2) - \log_\alpha(Q_{step\_target}^2) - \log_\alpha \\ (h(\text{frame\_size\_}enc)) - \log_\alpha(i(\text{frame\_rate\_}enc)). \quad (24)$$

The fair quality bitrate estimator 208 (see FIG. 2a) is operative to calculate, generate, determine, or otherwise obtain the fair quality bitrate of the encoded video provided by the video data sender 102. As described herein, the fair quality bitrate (also referred to herein as the "fair_quality_bitrate$_{nm}$"; see equation (25)) is defined herein to be a function of at least the "scaled_frame_size$_n$" (see equation (25)), the "scaled_frame_rate$_m$" (see equation (25)), and the number of bits per macroblock, "R" (see equation (25)), of the encoded video, as follows:

$$\text{fair\_quality\_bitrate}_{nm} = o(\text{scaled\_frame\_} \\ \text{size}_n, \text{scaled\_frame\_rate}_m, R). \quad (25)$$

In one embodiment, the fair_quality_bitrate estimator 208 can obtain the fair quality bitrate as a piecewise linear function of the video frame size and the video frame rate, having a slope corresponding to the number of bits per macroblock, R, of the encoded video, as follows:

$$\text{fair\_quality\_bitrate}_{nm} = R*\text{scaled\_frame\_size}_n*\text{scaled\_frame\_rate}_m. \quad (26)$$

In accordance with equation (26), the fair quality bitrate estimator 208 can set the slope, R, to different values for different 2-dimensional regions of the video frame size and video frame rate, taking into account that encoded video having a lower spatial or temporal resolution for the same video content generally requires more bits to encode each macroblock at the same video quality level. For example, setting the slope, R, to 30, the fair quality bitrate estimator 208 can calculate, generate, determine, or otherwise obtain a fair quality bitrate equal to about 89.1 kilobits per second (Kbps) for a Quarter Common Intermediate Format (QCIF) video frame at a video frame rate of 30 fps. Further, setting the slope, R, to 19.5, the fair quality bitrate estimator 208 can obtain a fair quality bitrate equal to about 232.1 Kbps for a Common Intermediate Format (CIF) video frame at the video frame rate of 30 fps. Still further, setting the slope, R, to 29.3, the fair quality bitrate estimator 208 can obtain a fair quality bitrate equal to about 174.1 Kbps for a CIF video frame at a video frame rate of 15 fps.

In a further embodiment, the fair quality bitrate estimator 208 can dynamically update the number of bits per macroblock, R, of the encoded video based on certain encoding statistics, and subsequently obtain the fair quality bitrate, as follows:

$$\text{fair\_quality\_bitrate}_{nm} = R*\text{scaled\_frame\_size}_n* \\ (\epsilon*\text{original\_frame\_rate} + (1-\epsilon)*\text{scaled\_frame\_} \\ \text{rate}_m), \quad (27)$$

in which "original_frame_rate" is the video frame rate of the video encoder 112 prior to being scaled by the scaling candidate handler 202 (see FIG. 2a), and "c" is a constant that can be set to 0.5 or any other suitable value. It is noted that obtaining the fair quality bitrate in accordance with equation (27) can provide an improved estimate of the fair quality bitrate for dynamic video content.

As further described herein, the video encoding parameter adaptation component 110 is operative, for each of the scaled frame size/frame rate pairs, to calculate, generate, determine, or otherwise obtain a scaling penalty that takes into account possible effects of spatial scaling and/or temporal scaling of video frames on the resulting video QoE. In one embodiment, the scaling penalty (also referred to herein as the "scaling_penalty$_{nm}$"; see equation (28)) can be defined to be a function of at least (1) the encoding parameter corresponding to the size of the last or previous video frame encoded by the video encoder 112 (also referred to herein as the "frame_size_enc"; see equation (28)), (2) the encoding parameter corresponding to the rate of the last or previous video frame encoded by the video encoder 112 (also referred to herein as the "frame_rate_enc"; see equation (28)), (3) the original or target video frame size (also referred to herein as the "frame_size_target"; see equation (28)), (4) the original or target video frame rate (also referred to herein as the "frame_rate_target"; see equation (28)), (5) the scaled video frame size (also referred to herein as the "scaled_frame_size$_n$"; see equation (28)), (6) the scaled video frame rate (also referred to herein as the "scaled_frame_rate$_m$"; see equation (28)), (7) the spatial complexity of the video content, and (8) the motion complexity of the video content, as follows:

$$\text{scaling\_penalty}_{nm} = p(\text{frame\_size\_target, frame\_} \\ \text{rate\_target, frame\_size\_}enc, \text{frame\_rate\_}enc, \\ \text{scaled\_frame\_size}_n, \text{scaled\_frame\_rate}_m, \text{spatial} \\ \text{complexity, motion complexity}). \quad (28)$$

The motion complexity of the video content can be defined in terms of the average amplitude of the motion vectors for each macroblock of the video content. Such motion vectors are generally defined in video compression standards (such as the H.264/AVC (Advanced Video Coding) video compression standard) as two-dimensional vectors that can be used for inter-prediction, each two-dimensional motion vector providing an offset from the coordinates in a current video frame to the coordinates in a corresponding reference video frame. The spatial complexity of the video content can be obtained by dividing the video content complexity, $\sigma^2$, by the square root of the motion complexity of the video content.

The scaling penalty estimator 206 (see FIG. 2a) can implement the function, "p(frame_size_target, frame_rate_target, frame_size_enc, frame_rate_enc, scaled_frame_size$_n$, scaled_frame_rate$_m$, spatial complexity, motion complexity)" (see equation (28)), using a lookup table, in which the scaling penalty is increased as the resolution employed by the video encoder 112 deviates away from the target resolution, as follows:

$$\text{scaling\_penalty\_scale}_{nm} = \{1 + \\ \text{ScalingPenaltyConstant}*m*n|n=0,1,\ldots,N-1; \\ m=0,1,\ldots,M-1\}, \quad (29)$$

in which "N" is the total number of predetermined spatial scaling factors, "n" corresponds to the $n^{th}$ one of the N predetermined spatial scaling factors, "M" is the total number of predetermined temporal scaling factors, "m" corresponds to the $m^{th}$ one of the M predetermined temporal scaling factors, and "ScalingPenaltyConstant" is a constant that can be determined empirically to be equal to 0.1 or any other suitable value.

In addition, the scaling penalty estimator 206 can calculate, generate, determine, or otherwise obtain different penalties for spatial scaling (also referred to herein as the "scaling_penalty spatial$_n$"; see equation (30)) and temporal scaling (also referred to herein as the "scaling_penalty temporal$_m$"; see equation (31)), as follows:

$$\text{scaling\_penalty\_spatial}_n = \{1.0 + \\ 30*\text{spatio\_temporal\_factor}*n|n=0,1,\ldots,N-1\}, \\ \text{and} \quad (30)$$

$$\text{scaling\_penalty\_temporal}_m = \{1.0+(m/\text{spatio\_temporal\_factor})|m=0,1,\ldots,M-1\}. \quad (31)$$

It is noted that the "spatio_temporal_factor" (see equations (30) and (31)) can be defined, as follows:

$$\text{spatio\_temporal\_factor} = \frac{6*(12-\text{frame\_size\_target}^\phi)}{\text{frame\_rate\_target}^\theta}, \quad (32)$$

in which "φ" and "θ" are constants that can be set to 0.25 and 0.5, respectively, or any other suitable values. The "scaling_penalty_scale$_{nm}$" (see equation (29)) can therefore be further expressed, as follows:

$$\text{scaling\_penalty\_scale}_{nm} = \text{scaling\_penalty\_spatial}_n * \text{scaling\_penalty\_temporal}_m, \quad (33)$$

in which "scaling_penalty_spatial$_n$" and "scaling_penalty_temporal$_m$" are defined as in equations (30) and (31), respectively.

The "spatio_temporal_factor" (see equation (32)) is employed in equations (30) and (31) for the purpose of prioritizing the dimension (spatial, temporal) of scaling based on the target resolution (as defined by the "frame_size_target" and the "frame_rate_target"; see equation (32)); i.e., prioritizing the use of spatial scaling over temporal scaling, or, alternatively, prioritizing the use of temporal scaling over spatial scaling. For example, for smaller video formats, such as the Common Intermediate Format (CIF) that defines video sequences with a reduced resolution of 352×288, the use of temporal scaling can be prioritized over spatial scaling. Further, for video formats such as 720P (1280×720) that have a high level of motion in the video content, the use of spatial scaling can be prioritized over temporal scaling.

The scaling penalty estimator 206 can further calculate, generate, determine, or otherwise obtain lower penalties for each of the N×M scaled frame size/frame rate pairs that are closer to the video frame size and video frame rate used to encode the previous video frame, as follows:

$$\text{scaling\_penalty\_change}_{nm} = 1 + \left(\frac{|\text{scaled\_frame\_size}_n - \text{frame\_size\_enc}|^\upsilon}{\text{frame\_size\_enc}}\right) + \left(\frac{|\text{scaled\_frame\_rate}_m - \text{frame\_rate\_enc}|^\nu}{\text{frame\_rate\_enc}}\right), \quad (34)$$

in which "υ" and "ν" are constants that can be set to 0.5 and 0.75, respectively, or any other suitable values. In this way, frequent changes in the video frame size and/or the video frame rate can be avoided by giving a preference to the current resolution.

The scaling penalty estimator 206 can further calculate, generate, determine, or otherwise obtain a higher penalty for a lower scaled frame rate in a video frame sequence that has an increased amount of motion, as follows:

$$\text{scaling\_penalty\_motion}_n = 1 + \frac{\text{motion\_complexity}}{\text{MAX\_MOTION\_COMPLEXITY}} * \frac{|\text{frame\_rate\_target} - \text{scaled\_frame\_rate}_m|^\nu}{\text{frame\_rate\_target}}, \quad (35)$$

in which "MAX_MOTION_COMPLEXITY" is a constant that can be set to 32 or any suitable value.

Likewise, the scaling penalty estimator 206 can calculate, generate, determine, or otherwise obtain a higher penalty for a lower scaled frame size in a video frame sequence that has an increased amount of spatial complexity (i.e., the video frame sequence contains an increased amount of spatial details), as follows:

$$\text{scaling\_penalty\_details}_n = 1 + \frac{\text{spatial\_complexity}}{\text{MAX\_SPATIAL\_COMPLEXITY}} * \frac{|\text{frame\_size\_target} - \text{scaled\_frame\_size}_n|^\nu}{\text{frame\_size\_target}}, \quad (36)$$

in which "MAX_SPATIAL_COMPLEXITY" is a constant that can be set to 200,000 or any suitable value. Taking into account the various penalties derived in equations (33), (34), (35), and/or (36), the scaling penalty estimator 206 (see FIG. 2a) can determine the scaling penalty for each of the N×M scaled video frame size/frame rate pairs by obtaining any suitable multiplicative product of such penalties, as follows:

$$\text{scaling\_penalty}_{nm} = \text{scaling\_penalty\_scale}_{nm} * \text{scaling\_penalty\_change}_{nm} * \text{scaling\_penalty\_motion}_m * \text{scaling\_penalty\_details}_n. \quad (37)$$

Having obtained the fair quality bitrate and the scaling penalty for each of the N×M scaled frame size/frame rate pairs, the video encoding parameter adaptation component 110 can calculate a score value for the respective scaled frame size/frame rate pair. As described herein, such a score value (also referred to herein as the "score$_{nm}$"; see equation 38)) can be a function of at least (1) the absolute value of the difference between the fair quality bitrate (i.e., the "fair_quality_bitrate$_{nm}$"; see equations (25), (26), (27), and (38)) and the target bitrate (also referred to herein as the "target bitrate"; see equation (38)) obtained from the estimated available bandwidth of the video data receiver 104, and (2) the scaling penalty (i.e., the "scaling_penalty$_{nm}$"; see equations (28), (37), and (38)), as follows:

$$\text{score}_{nm} = 1/(|\text{fair\_quality\_bitrate}_{nm} - \text{target\_bitrate}|*\text{scaling\_penalty}_{nm}). \quad (38)$$

In one embodiment, the score value calculator 210 can calculate the score value (i.e., the "score$_{nm}$"; see equation (38)) by calculating, generating, determining, or otherwise obtaining the reciprocal of the product of the scaling penalty (i.e., the "scaling_penalty$_{nm}$"; see equation (38)) and the absolute value of the difference between the fair quality bitrate (i.e., the "fair_quality_bitrate$_{nm}$"; see equation (38)) and the target bitrate (i.e., the "target_bitrate"; see equation (38)), as follows:

$$\text{score}_{nm} = 1/(|\text{fair\_quality\_bitrate}_{nm} - \text{target\_bitrate}|*\text{scaling\_penalty}_{nm}). \quad (39)$$

Further, the scaled frame size/frame rate pair identifier 212 (see FIG. 2a) within the video encoding parameter adaptation component 110 can compare the score values (i.e., the "score$_{nm}$"; see equations (38) and (39)) for the respective scaled frame size/frame rate pairs to identify the scaled frame size/frame rate pair having the maximum score value, and obtain, from the identified scaled frame size/frame rate pair, the scaled frame size/frame rate values that the video data sender 102 can use to provide encoded video having a resolution and bitrate closest to the target resolution and bitrate. For example, in the event the score value for the scaled frame size/frame rate pair corresponding to "n=1" and "m=1" (see TABLES I and II) is identified as having the maximum score value (i.e., the score$_{11}$), then the scaled frame size values of 960 (width) and 540 (height), as well as the scaled frame rate value of 20 fps, can be obtained from the identified scaled frame size/frame rate pair. The scaled frame size/frame rate pair identifier 212 can then provide the scaled frame size/frame rate values specified by the identified scaled frame size/frame rate pair (e.g., 960×540; 20 fps) for subsequent reconfiguration of the video encoder 112.

It is noted that the multimedia communications system 100 (see FIG. 1) described herein allows the video data sender 102 to increase the video frame size and/or the video frame rate once the available bandwidth to one or more video data receivers (such as the video data receiver 104) increases. In addition, depending upon the use case, a minimum time interval can be set for the video data sender 102 to change the video frame size and/or the video frame rate. For example, such a minimum time interval can be about 3 seconds for WebRTC (Web Real-Time Communication) communications over the Internet.

It is noted that the video encoder 112 can be configured to operate in accordance with the H.263 video compression format, the H.264/AVC video compression format, the VP8 video compression format, or any other suitable video compression format that allows the video encoder 112 to dynamically adapt its encoding parameters to specified changes in the video frame size and/or the video frame rate, in accordance with the systems and methods described herein. Moreover, the multimedia communications system 100 can be configured to operate in accordance with the WebRTC API (Application Programming Interface) definition, or any other suitable API definition that supports applications requiring such specified changes in the video frame size/frame rate to be performed at a video data sender (such as the video data sender 102; see FIG. 1), as well as subsequent interpolation of the encoded video to be performed, as required and/or desired, at a video data receiver (such as the video data receiver 104; see FIG. 1).

Figure 3:
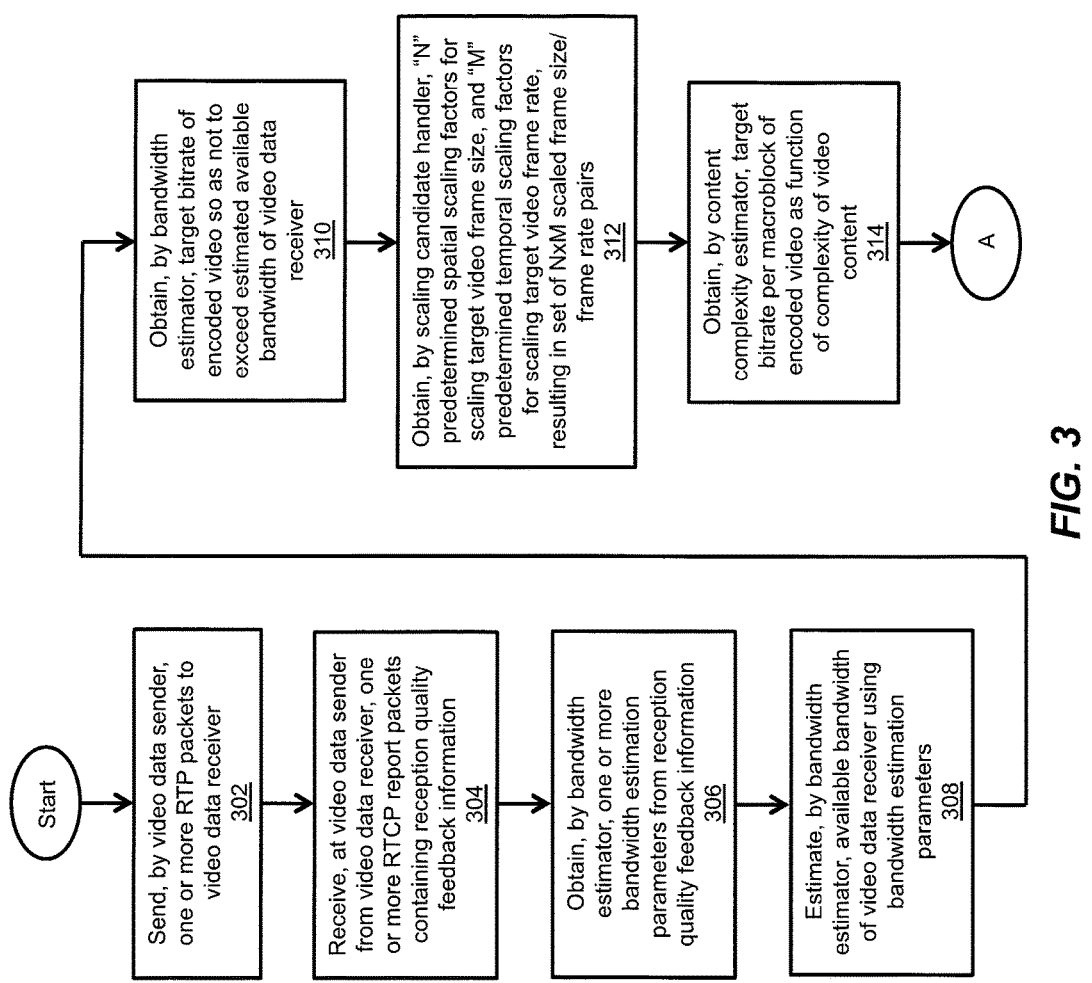
FIG. 3 is a flow diagram of an exemplary method of dynamically adapting video encoding parameters employed by the video data sender of FIG. 1, including at least a video frame size and/or a video frame rate, to an available bandwidth of the video data receiver of FIG. 1.
Figure 3:
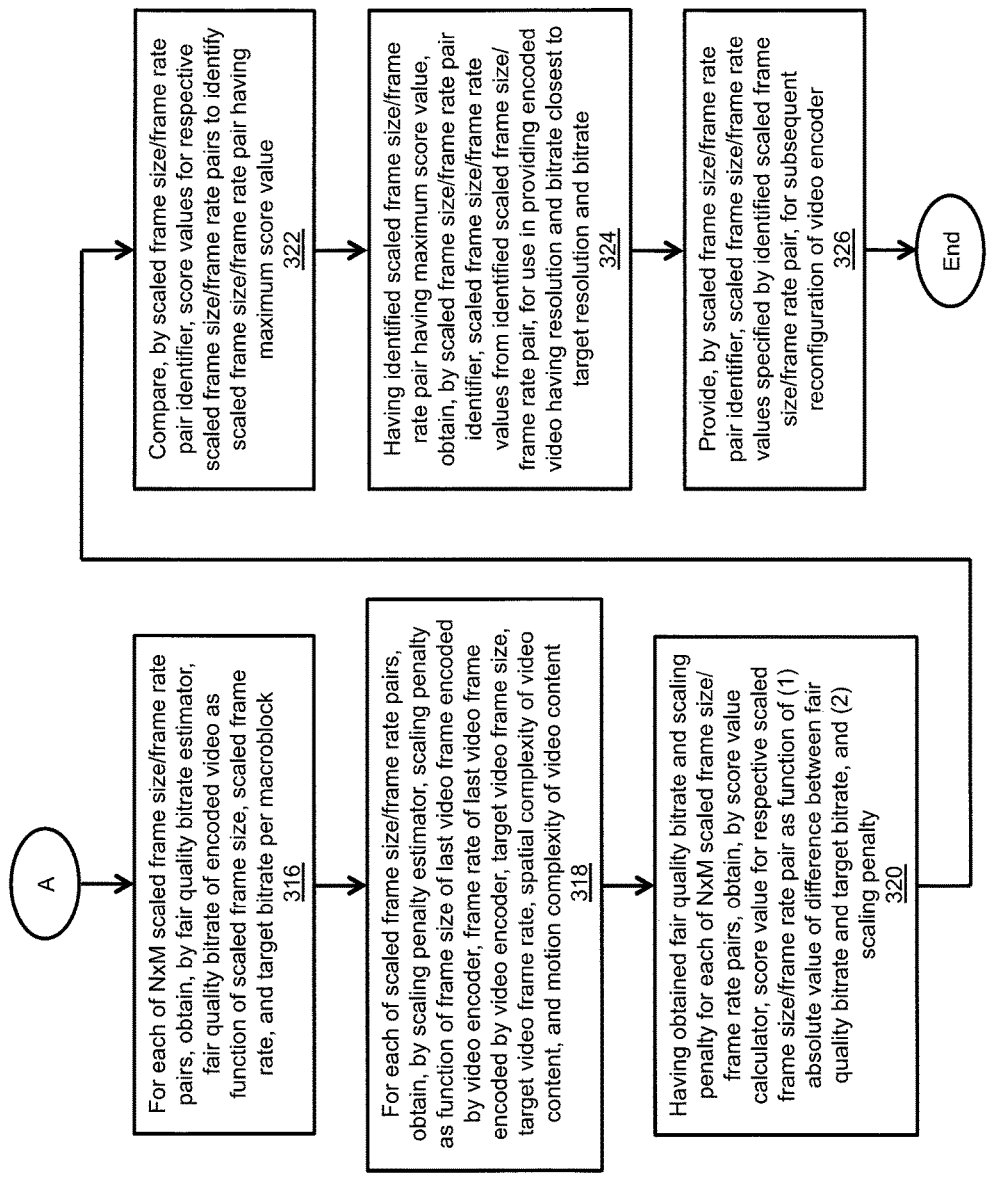

A method of dynamically adapting video encoding parameters including at least a video frame size and/or a video frame rate employed by the video data sender 102 to an available bandwidth of the video data receiver 104 is described herein with reference to FIGS. 1, 2a, and 3. As depicted in block 302 (see FIG. 3), one or more RTP packets are sent, by the video data sender 102 (see FIG. 1), to the video data receiver 104 (see FIG. 1). As depicted in block 304 (see FIG. 3), one or more RTCP report packets containing reception quality feedback information are received at the video data sender 102 from the video data receiver 104. As depicted in block 306 (see FIG. 3), one or more bandwidth estimation parameters are obtained by the bandwidth estimator 108 (see FIG. 1) from the reception quality feedback information. As depicted in block 308 (see FIG. 3), the available bandwidth of the video data receiver 104 is estimated by the bandwidth estimator 108 using at least the bandwidth estimation parameters. As depicted in block 310 (see FIG. 3), a target bitrate of encoded video is obtained by the bandwidth estimator 108, so as not to exceed the estimated available bandwidth of the video data receiver 104. As depicted in block 312 (see FIG. 3), "N" predetermined spatial scaling factors for scaling a target video frame size, and "M" predetermined temporal scaling factors for scaling a target video frame rate, are obtained by the scaling candidate handler 202 (see FIG. 2a), resulting in a set of N×M scaled frame size/frame rate pairs. As depicted in block 314 (see FIG. 3), the target bitrate per macroblock of the encoded video is obtained by the content complexity estimator 204 (see FIG. 2a) as a function of at least the complexity of the content of the video. As depicted in block 316 (see FIG. 3), for each of the N×M scaled frame size/frame rate pairs, the fair quality bitrate of the encoded video is obtained by the fair quality bitrate estimator 208 (see FIG. 2a) as a function of at least the scaled frame size, the scaled frame rate, and the target bitrate per macroblock. As depicted in block 318 (see FIG. 3), for each of the scaled frame size/frame rate pairs, a scaling penalty is obtained by the scaling penalty estimator 206 (see FIG. 2a) as a function of at least the size of the last video frame encoded by the video encoder 112 (see FIG. 1), the frame rate of the last video frame encoded by the video encoder 112, the target video frame size, the target video frame rate, the spatial complexity of the video content, and the motion complexity of the video content. As depicted in block 320 (see FIG. 3), having obtained the fair quality bitrate and the scaling penalty for each of the N×M scaled frame size/frame rate pairs, a score value is obtained by the score value calculator 210 (see FIG. 2a) for the respective scaled frame size/frame rate pair as a function of at least (1) the absolute value of the difference between the fair quality bitrate and the target bitrate and (2) the scaling penalty. As depicted in block 322 (see FIG. 3), the score values for the respective scaled frame size/frame rate pairs are compared by the scaled frame size/frame rate pair identifier 212 (see FIG. 2a) to identify the scaled frame size/frame rate pair having the maximum score value. As depicted in block 324 (see FIG. 3), having identified the scaled frame size/frame rate pair having the maximum score value, scaled frame size/frame rate values are obtained by the scaled frame size/frame rate pair identifier 212 from the identified scaled frame size/frame rate pair for use in providing encoded video having a resolution and bitrate closest to the target resolution and bitrate. As depicted in block 326, the scaled frame size/frame rate values specified by the identified scaled frame size/frame rate pair are provided by the scaled frame size/frame rate pair identifier 212 for subsequent reconfiguration of the video encoder 112.

It is noted that the operations herein described are purely exemplary and imply no particular order. Further, the operations can be used in any sequence when appropriate and can be partially used. With the above illustrative embodiments in mind, it should be understood that the above-described systems and methods could employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and/or otherwise manipulated.

Moreover, any of the operations described herein that form part of the above-described systems and methods are useful machine operations. The above-described systems and methods also relate to a device or an apparatus for performing such operations. The apparatus can be specially constructed for the required purpose, or the apparatus can be a general-purpose computer selectively activated or configured by a software program stored in the computer. In particular, various general-purpose machines employing one or more processors coupled to one or more computer readable media can be used with software programs written in accordance with the teachings herein, or it may be more convenient to construct a more specialized apparatus to perform the required operations.

The above-described systems and methods can also be embodied as computer readable code on a computer readable medium. The computer readable medium is any data storage device that can store data, which can be thereafter be read by a computer system. Examples of such computer readable media include hard drives, read-only memory (ROM), random-access memory (RAM), CD-ROMs, CD-Rs, CD-RWs, magnetic tapes, and other optical and non-optical data storage devices. The computer readable media can also be distributed over a network-coupled computer system so that the computer readable code is stored and executed in a distributed fashion.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. In a multimedia communications system, a method of dynamically adapting video encoding parameters of a video data sender to an available bandwidth of a video data receiver, comprising:
    obtaining a target bitrate of encoded video for the video data receiver;
    obtaining a plurality of scaled frame size and scaled frame rate pairs, each scaled frame size and scaled frame rate pair including a frame size scaled by a predetermined spatial scaling factor, and a frame rate scaled by a predetermined temporal scaling factor;
    for each scaled frame size and scaled frame rate pair:
        obtaining a second bitrate of the encoded video as a first function of at least the scaled frame size and the scaled frame rate; and
        obtaining a score value as a second function of at least an absolute difference between the second bitrate and the target bitrate of the encoded video; and
    configuring a video encoder of the video data sender with the scaled frame size and the scaled frame rate included in the respective scaled frame size and scaled frame rate pair having a score value satisfying a predetermined condition.

2. The method of claim 1, wherein the respective scaled frame size and scaled frame rate pairs include different scaled frame sizes and a specified scaled frame rate, and wherein the obtaining of the second bitrate includes:
    for each scaled frame size and scaled frame rate pair, obtaining the second bitrate of the encoded video as the first function of at least the scaled frame size and the scaled frame rate, the scaled frame size corresponding to a respective one of the different scaled frame sizes, and the scaled frame rate corresponding to the specified scaled frame rate.

3. The method of claim 1, wherein the respective scaled frame size and scaled frame rate pairs include a specified scaled frame size and different scaled frame rates, and wherein the obtaining of the second bitrate includes:
    for each scaled frame size and scaled frame rate pair, obtaining the second bitrate of the encoded video as the first function of at least the scaled frame size and the scaled frame rate, the scaled frame size corresponding to the specified scaled frame size, and the scaled frame rate corresponding to a respective one of the different scaled frame rates.

4. The method of claim 1, wherein the obtaining of the second bitrate of the encoded video includes obtaining the second bitrate as the first function of at least the scaled frame size, the scaled frame rate, and a number of bits per macroblock of the encoded video.

5. In a multimedia communications system, a method of dynamically adapting video encoding parameters of a video data sender to an available bandwidth of a video data receiver, comprising:
    obtaining a target bitrate of encoded video for the video data receiver;
    obtaining a plurality of scaled frame size and scaled frame rate pairs, each scaled frame size and scaled frame rate pair including a frame size scaled by a predetermined spatial scaling factor, and a frame rate scaled by a predetermined temporal scaling factor;
    for each scaled frame size and scaled frame rate pair:
        obtaining a second bitrate of the encoded video as a first function of at least the scaled frame size, the scaled frame rate, and a content complexity of the encoded video; and
        obtaining a score value as a second function of at least an absolute difference between the second bitrate and the target bitrate of the encoded video; and
    configuring a video encoder of the video data sender with the scaled frame size and the scaled frame rate included in the respective scaled frame size and scaled frame rate pair having a score value satisfying a predetermined condition.

6. The method of claim 5, wherein the respective scaled frame size and scaled frame rate pairs include different scaled frame sizes and a specified scaled frame rate, and wherein the obtaining of the second bitrate includes:
    for each scaled frame size and scaled frame rate pair, obtaining the second bitrate of the encoded video as the first function of at least the scaled frame size, the scaled frame rate, and the content complexity of the encoded video, the scaled frame size corresponding to a respective one of the different scaled frame sizes, and the scaled frame rate corresponding to the specified scaled frame rate.

7. The method of claim 5, wherein the respective scaled frame size and scaled frame rate pairs include a specified scaled frame size and different scaled frame rates, and wherein the obtaining of the second bitrate includes:
    for each scaled frame size and scaled frame rate pair, obtaining the second bitrate of the encoded video as the first function of at least the scaled frame size, the scaled frame rate, and the content complexity of the encoded video, the scaled frame size corresponding to the specified scaled frame size, and the scaled frame rate corresponding to a respective one of the different scaled frame rates.

8. The method of claim 5, wherein the obtaining of the second bitrate of the encoded video includes obtaining the second bitrate as the first function of at least the scaled frame size, the scaled frame rate, the content complexity of the encoded video, and a number of bits per macroblock of the encoded video, the number of bits per macroblock of the encoded video being a third function of at least the content complexity of the encoded video.

9. The method of claim 8, further comprising:
    obtaining the content complexity of the encoded video as a fourth function of at least a resolution of frames encoded by the video encoder, a third bitrate of the encoded video, and a quantization step size of the encoded video.

10. In a multimedia communications system, a method of dynamically adapting video encoding parameters of a video data sender to an available bandwidth of a video data receiver, comprising:

obtaining a target bitrate of encoded video for the video data receiver;
obtaining a plurality of scaled frame size and scaled frame rate pairs, each scaled frame size and scaled frame rate pair including a frame size scaled by a predetermined spatial scaling factor, and a frame rate scaled by a predetermined temporal scaling factor;
for each scaled frame size and scaled frame rate pair:
obtaining a second bitrate of the encoded video as a first function of at least the scaled frame size and the scaled frame rate;
obtaining a scaling penalty as a second function of at least a frame size of a previous encoded frame of the encoded video and a frame rate of the previous encoded frame of the encoded video; and
obtaining a score value as a third function of at least the scaling penalty and an absolute difference between the second bitrate and the target bitrate of the encoded video; and
configuring a video encoder of the video data sender with the scaled frame size and the scaled frame rate included in the respective scaled frame size and scaled frame rate pair having a score value satisfying a predetermined condition.

11. The method of claim 10, wherein the respective scaled frame size and scaled frame rate pairs include different scaled frame sizes and a specified scaled frame rate, and wherein the obtaining of the second bitrate includes:
for each scaled frame size and scaled frame rate pair, obtaining the second bitrate of the encoded video as the first function of at least the scaled frame size and the scaled frame rate, the scaled frame size corresponding to a respective one of the different scaled frame sizes, and the scaled frame rate corresponding to the specified scaled frame rate.

12. The method of claim 10, wherein the respective scaled frame size and scaled frame rate pairs include a specified scaled frame size and different scaled frame rates, and wherein the obtaining of the second bitrate includes:
for each scaled frame size and scaled frame rate pair, obtaining the second bitrate of the encoded video as the first function of at least the scaled frame size and the scaled frame rate, the scaled frame size corresponding to the specified scaled frame size, and the scaled frame rate corresponding to a respective one of the different scaled frame rates.

13. The method of claim 10, wherein the obtaining of the second bitrate of the encoded video includes obtaining the second bitrate as the first function of at least the scaled frame size, the scaled frame rate, and a number of bits per macroblock of the encoded video.

14. In a multimedia communications system, a method of dynamically adapting video encoding parameters of a video data sender to an available bandwidth of a video data receiver, comprising:
obtaining a target bitrate of encoded video for the video data receiver;
obtaining a set of scaled frame size and scaled frame rate pairs, each scaled frame size and scaled frame rate pair including a frame size scaled by a predetermined spatial scaling factor, and a frame rate scaled by a predetermined temporal scaling factor, the respective scaled frame size and scaled frame rate pairs including different scaled frame sizes and a specified scaled frame rate;
for each scaled frame size and scaled frame rate pair:
obtaining a second bitrate of the encoded video as a first function of at least the scaled frame size, the scaled frame rate, and a content complexity of the encoded video, the scaled frame size corresponding to a respective one of the different scaled frame sizes, and the scaled frame rate corresponding to the specified scaled frame rate;
obtaining a scaling penalty as a second function of at least a frame size of a previous encoded frame of the encoded video, a frame rate of the previous encoded frame of the encoded video, and the content complexity of the encoded video; and
obtaining a score value as a third function of at least the scaling penalty and an absolute difference between the second bitrate and the target bitrate of the encoded video; and
configuring a video encoder of the video data sender with the scaled frame size and the scaled frame rate included in the respective scaled frame size and scaled frame rate pair having a score value satisfying a predetermined condition.

15. The method of claim 14, wherein the obtaining of the second bitrate of the encoded video includes obtaining the second bitrate as the first function of at least the scaled frame size, the scaled frame rate, the content complexity of the encoded video, and a number of bits per macroblock of the encoded video, the number of bits per macroblock of the encoded video being a fourth function of at least the content complexity of the encoded video.

16. The method of claim 15, further comprising:
obtaining the content complexity of the encoded video as a fifth function of at least a resolution of frames encoded by the video encoder, a third bitrate of the encoded video, and a quantization step size of the encoded video.

17. In a multimedia communications system, a method of dynamically adapting video encoding parameters of a video data sender to an available bandwidth of a video data receiver, comprising:
obtaining a target bitrate of encoded video for the video data receiver;
obtaining a set of scaled frame size and scaled frame rate pairs, each scaled frame size and scaled frame rate pair including a frame size scaled by a predetermined spatial scaling factor, and a frame rate scaled by a predetermined temporal scaling factor, the respective scaled frame size and scaled frame rate pairs including a specified scaled frame size and different scaled frame rates;
for each scaled frame size and scaled frame rate pair:
obtaining a second bitrate of the encoded video as a first function of at least the scaled frame size, the scaled frame rate, and a content complexity of the encoded video, the scaled frame size corresponding to the specified scaled frame size, and the scaled frame rate corresponding to a respective one of the different scaled frame rates;
obtaining a scaling penalty as a second function of at least a frame size of a previous encoded frame of the encoded video, a frame rate of the previous encoded frame of the encoded video, and the content complexity of the encoded video; and
obtaining a score value as a third function of at least the scaling penalty and an absolute difference between the second bitrate and the target bitrate of the encoded video; and configuring a video encoder of the video data sender with the scaled frame size and the scaled frame rate included in the respective scaled frame size and scaled frame rate pair having a score value satisfying a predetermined condition.

18. The method of claim 17, wherein the obtaining of the second bitrate of the encoded video includes obtaining the second bitrate as the first function of at least the scaled frame size, the scaled frame rate, the content complexity of the encoded video, and a number of bits per macroblock of the encoded video, the number of bits per macroblock of the encoded video being a fourth function of at least the content complexity of the encoded video.

19. The method of claim 18, further comprising:
obtaining the content complexity of the encoded video as a fifth function of at least a resolution of frames encoded by the video encoder, a third bitrate of the encoded video, and a quantization step size of the encoded video.

* * * * *